United States Patent [19]

Blitshteyn

[11] Patent Number: 5,443,703
[45] Date of Patent: Aug. 22, 1995

[54] METHOD AND APPARATUS FOR SIMULTANEOUS ELECTRICAL DISCHARGE TREATMENT OF AND ADHESIVE APPLICATION TO A POLYMER COMPONENT

[75] Inventor: Mark Blitshteyn, Bloomingdale, Ill.

[73] Assignee: Tantec, Inc., Schaumburg, Ill.

[21] Appl. No.: 284,197

[22] Filed: Aug. 2, 1994

[51] Int. Cl.$^6$ ............................................... H05F 3/00
[52] U.S. Cl. ...................... 204/165; 204/164; 422/186.05; 264/22; 425/174.8 E
[58] Field of Search ......................... 204/165, 164; 422/186.05; 264/22; 425/174.8 R

[56] References Cited

U.S. PATENT DOCUMENTS

| | | | |
|---|---|---|---|
| 3,755,683 | 8/1973 | Kiikka et al. | 204/165 |
| 4,836,901 | 6/1989 | Manabe et al. | 204/164 |
| 4,929,319 | 5/1990 | Dinter et al. | 204/164 |

Primary Examiner—John Niebling
Assistant Examiner—Kishor Mayekar
Attorney, Agent, or Firm—Leydig, Voit & Mayer, Ltd.

[57] ABSTRACT

An apparatus for simultaneous electrical discharge treatment and adhesive application to a polymer component. The apparatus includes a jig having an electrically conductive region and a dispenser having an electrically grounded dispensing tip with a dispenser orifice which functions as an electrode as it is moved across an upper surface of the polymer component in close proximity thereto. During such movement, the tip coacts with the jig which underlies the component and to which high voltage is applied to create an electrical discharge which is directed onto the component and makes the surface thereof susceptible to bonding with adhesive applied to the component from the tip virtually simultaneously with the discharge.

26 Claims, 2 Drawing Sheets

METHOD AND APPARATUS FOR SIMULTANEOUS ELECTRICAL DISCHARGE TREATMENT OF AND ADHESIVE APPLICATION TO A POLYMER COMPONENT

BACKGROUND OF THE INVENTION

This invention relates to the application of adhesive to molded plastic components which may, for example, be covered with a decorative fabric. A typical component is a plastic pillar located adjacent the foldable back seat of a station wagon. To improve the appearance of the pillar, its exposed surfaces are covered, either partially or entirely, with fabric which is adhesively secured to the plastic.

Previously, most vehicle trim components have been molded of ABS plastic which readily lends itself to use with adhesive but which is relatively expensive. Polymer materials such as polyethylene and polypropylene are significantly less costly but, due to their non-polar chemical structure, do not bond well to adhesives. As a result, it has been necessary to surface treat such materials to increase the wetability of their surfaces.

It is known to treat the surfaces of components made of thermoplastic olefins by means of a high voltage discharge created by moving an electrode along a predetermined path. For example, Manabe et al. U.S. Pat. No. 4,836,901 discloses an electrode which is moved along multiple axes by the arm of an industrial robot and which acts to surface treat those areas of the component where adhesive is subsequently applied. The Manabe et al. system, however, is relatively complex and, if used in an automated production line, would require one manufacturing station to be dedicated to surface treatment and a separate station to the application of adhesive. Moreover, in the Manabe et al. system, the electrode which is carried by the robot arm is at high voltage and thus special insulation and mounting arrangements are required in order to eliminate or minimize discharge between the electrode and the generally electrically grounded components of the robot. Also, routing of an unsheathed high voltage cable to the electrode may require special insulating stand-offs to prevent the cable from contacting grounded components of the robot and may interfere with freedom of movement of the robot arm. Although it is known to apply the high voltage to a stationary jig, while maintaining a discharge electrode at ground so as to minimize insulation of the robot, such system still necessitates the use of a separate station for the application of adhesives.

SUMMARY OF THE INVENTION

The general aim of the present invention is to provide a method and apparatus for applying adhesive to relatively inexpensive plastic such as polyethylene and polypropylene without need of a separate surface treatment station or step.

A more detailed object of the invention is to achieve the foregoing by providing a method and apparatus for simultaneous electrical discharge treatment of and adhesive application to the surface of a plastic component.

A further object is to provide a method and apparatus as characterized above which is adapted for treating selected areas of the surface of a plastic component and simultaneously applying adhesive to the treated areas.

The invention also resides in advantageously using the electrical discharge to increase the bonding characteristics of the adhesive itself.

These and other objects and advantages of the invention will become more apparent from the following detailed description when taken in conjunction with the accompanying drawings.

Figure 1:
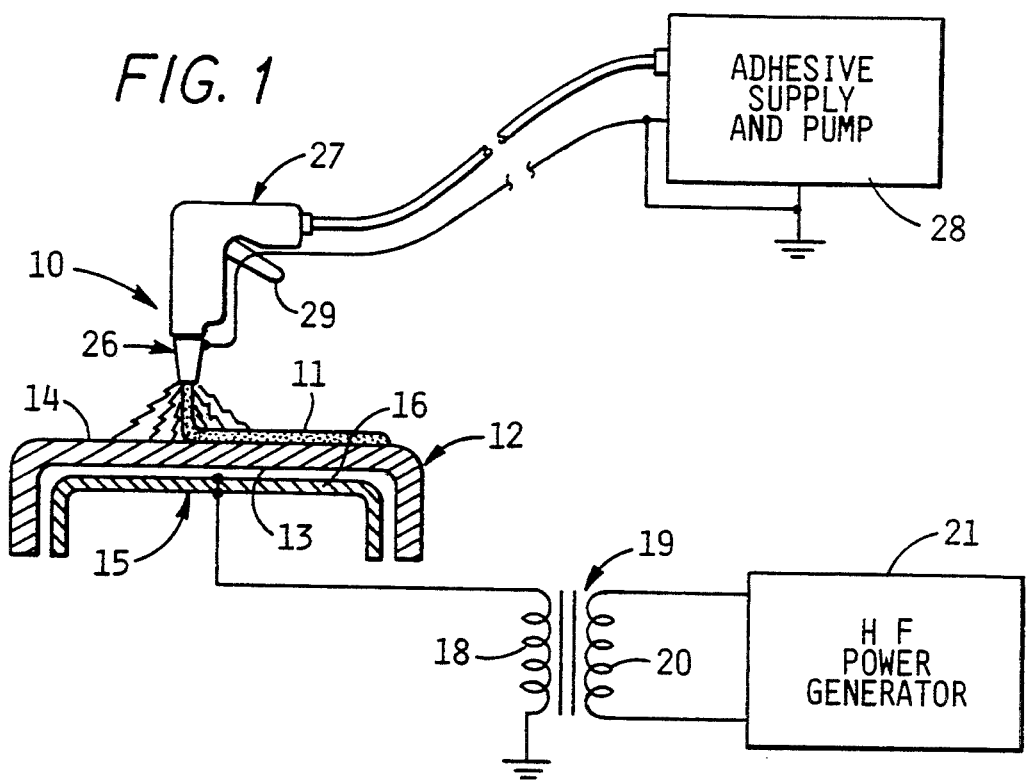
FIG. 1 is a schematic view of one embodiment of new and improved apparatus for carrying out the unique method of the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as incorporated in apparatus 10 for applying adhesive 11 to a plastic component 12 and particularly to polymer components molded of thermoplastic olefins such as polyethylene, polypropylene or derivatives thereof. The adhesive may be of any suitable type such as hot-melt glue, moisture-cure urethane or the like.

The particular component 12 which has been illustrated is a generally U-shaped trim part having inner and outer surfaces 13 and 14. Adhesive 11 is applied in a predetermined pattern to selected areas of the outer surface and thereafter a decorative fabric (not shown) is placed on the surface and bonded thereto by the adhesive. It will be appreciated, however, that the principles of the invention are applicable to a wide variety of plastic components which, for one reason or another, require a coating of adhesive to enable the component to be bonded to another component.

Application of adhesive to components made of relatively expensive ABS or engineering plastic is a comparatively simple matter since such plastics inherently lend themselves to bonding with the adhesive. That is not the case, however, with less costly and easier recyclable polymer materials such as polyethylene and polypropylene. The latter materials have a non-polar and inert chemical structure and their surfaces have poor wetability characteristics.

It is known that adhesives may be applied to relatively low-cost polymer components by treating their surfaces with a high voltage discharge to make those areas which are to receive an adhesive more susceptible to bonding with the adhesive. Prior arrangements, however, require separate stations for treating the surface and applying the adhesive, and thus, the apparatus for performing the functions is relatively complex and requires a significant amount of floor space.

In accordance with the present invention, a significant cost reduction is realized by surface treating the component 12 to bond with the adhesive 11 and by applying the adhesive to the component substantially simultaneously with the surface treatment. In this way, the surface may be treated and the adhesive may be applied at a single station with simpler apparatus requiring less floor space and expense than heretofore possible.

Figure 2:
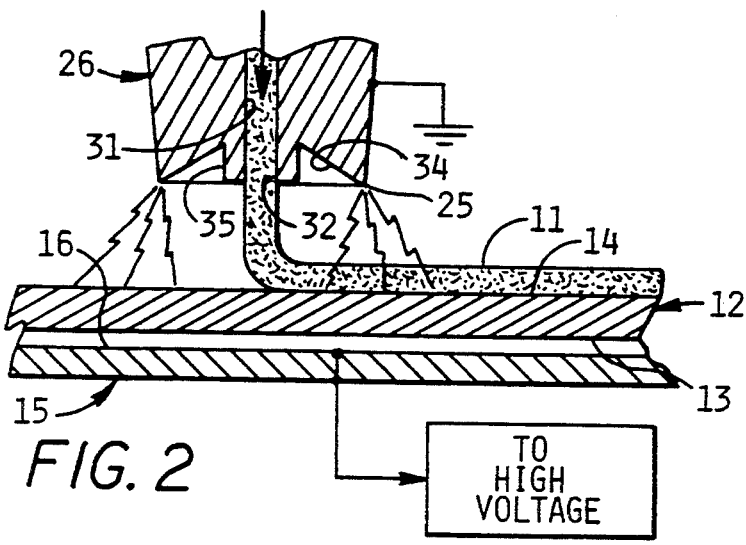
FIG. 2 is an enlarged fragmentary view of certain parts shown in FIG. 1.

More specifically, the invention is carried out through the use of a fixture or jig 15 having an electrically conductive region or surface 16 (FIG. 2) which conforms in shape at least in part to the shape of the inner surface 13 of the plastic component 12. While the jig may be made entirely of metal, the preferred jig is formed from epoxy resin or other formable dielectric material. The surface 16 then is made electrically conductive by coating either the entire surface with metal or other conductive material or by coating only selective areas underlying those areas to which adhesive 11 is to be applied to the outer surface 14 of the component 12. Rather than coating the surface 14, a metal tape with a pressure-sensitive adhesive backing may be applied to that surface in a pattern corresponding to the desired adhesive pattern. As a further alternative, a metal conductor, such as a wire 17 (FIG. 5), may be placed in a dielectric jig 15' in a predetermined pattern during formation of the jig, the wire being located closely adjacent the surface 16'. It will be understood that in each of the jig embodiments, the component 12 is placed adjacent the jig, such as shown in FIG. 1, with the inner surface of the component either in contact with or in very close proximity to the conductive surface 16 of the jig.

In carrying out the invention, high voltage is applied directly to the conductive region 16 of the jig 15. For this purpose, the conductive surface 16 (or the wire 17 in the case of the jig 16 of FIG. 5) is connected to the secondary coil 18 (FIG. 1) of a transformer 19 whose primary coil 20 is connected to a high frequency power generator 21, which preferably is capable is producing a high wattage aco signal at a frequency ranging between 50 Hz and 3 MHz. The transformer preferably is capable of amplifying the output signal of the generator to a range of between 3 and 100 kilovolts RMS. In practice, a Tantec Model HV-09 high frequency high power generator has been used with a Tantec Model Super C transformer for applying high voltage to the conductive surface 16 in the range of between 10 and 60 Kilovolts with a frequency between 10 kHz and 40 kHz.

Figure 3:
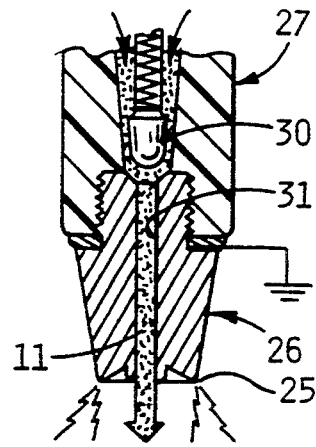
FIG. 3 is a fragmentary cross-sectional view taken axially through one version of a combined discharge electrode and adhesive dispensing tip.

In keeping with an important aspect of the invention, an adhesive dispenser 27 is provided which has an adhesive dispensing tip 26 formed of an electrically conductive material so as to also function as a discharge electrode. The adhesive dispensing tip 26 may be made of metal, and as part of the adhesive dispenser 27, may be electrically grounded. The dispenser 27 has been illustrated schematically as including a trigger 29 which may be actuated to open a valve 30 (FIG. 3) and enable adhesive to flow through a passage 31 in the tip and out of a dispensing orifice 32 in the free end of the tip. It will be appreciated that the valve 30 may be opened and closed under automatic control so as to dispense adhesive 11 only on spaced predetermined areas of the component 12. A suitable dispenser is one sold by Bostick under the trade designator BOSS III.

Figure 4:
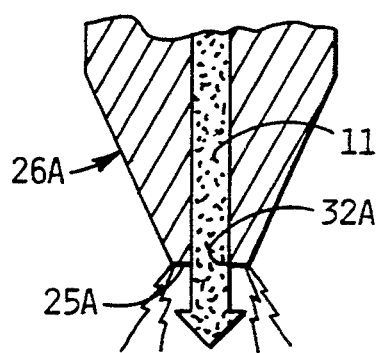
FIG. 4 shows an alternate electrode and dispensing tip.

The adhesive dispensing tip 26 in this case is specifically formed with an upwardly projecting frustoconical pocket 34 (FIG. 2) which defines a sharp annular electrode edge 25 in surrounding relation about the dispensing orifice 32 of the dispensing tip 26 so as to enhance the high voltage discharge from the grounded dispensing tip 26. The dispensing tip 26 further is formed with a projection or nozzle 35 extending axially from the center of the pocket 34 through which the passage 31 extends. The end of the projection or nozzle 35 preferably is co-planar with the annular electrode edge 25. In an alternative dispensing tip 26A (FIG. 4), the end of the tip is flat and planar and defines an annular electrode edge 25A which is coplanar with a dispensing orifice 32A.

In operation, the lower end of the dispensing tip 26 is located above the outer surface 14 of the component 12 and is spaced therefrom by a distance preferably ranging between 1 mm and 15 mm. The dispensing tip then is moved horizontally across the component in a path determined by the adhesive pattern required on the component. As an incident to such movement, the dispensing tip 26 which functions as an electrically grounded electrode, and particularly the annual electrode edge 25, coacts with the high voltage at the underlying conductive surface 16 of the jig 15 to cause an electrical discharge to be directed downwardly onto the outer surface 14 of the component. It will be understood that some discharge may also occur around the annular edge of the protruding nozzle 35. The plasma existing in such discharge is effective to modify the surface 14 of the component and improve the bonding properties of such surface. Advantageously, the adhesive 11 is dispensed from the orifice 32 at the same time as the electrical discharge occurs and thus is immediately applied to the treated surface 14. In the embodiment illustrated in FIGS. 1-3, at least a portion of the electrical discharge immediately precedes the dispensing orifice 32 and thus the surface 14 is treated just prior to and during application of the adhesive. It is believed, although without complete certainty, that the electrical discharge also improves the bonding characteristics of the adhesive itself. In the preferred tip of FIGS. 2 and 3, the pocket 34 surrounding the protruding nozzle 35 acts to minimize the build-up of adhesive around the annular electrode edge 25 so as not to impede the electrical discharge.

Figure 6:
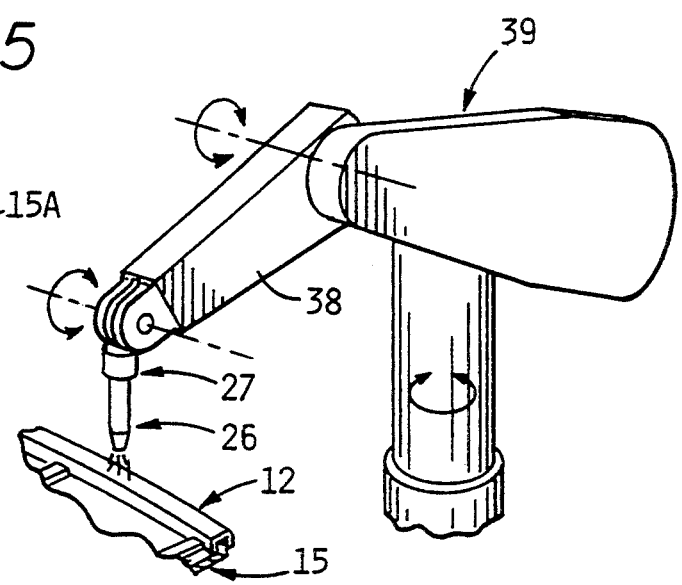
FIG. 6 is a perspective view of a typical robot for moving the electrode/dispensing tip along a predetermined path.

The adhesive dispenser 27 may be carried and moved by the arm 38 of a multi-axis robot 39 as shown in FIG. 6. By virtue of voltage being applied to the jig 16 and by virtue of the dispensing tip 26 being grounded, the chances of the discharge affecting the logic of the control circuits of the robot through electrical interference are significantly reduced and, in addition, there are no conductors to restrict freedom of movement of the arm. In lieu of being carried on a robot arm, the dispenser 27 may be mounted on the carriage of a CNC machine 40

Figure 7:
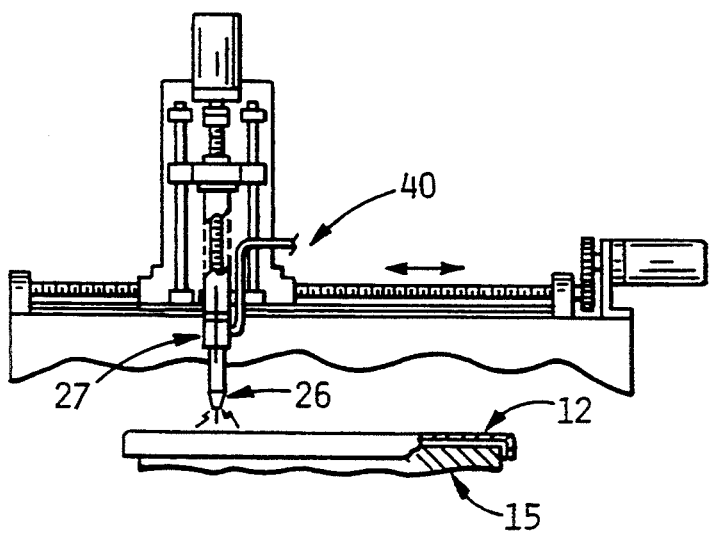
FIG. 7 is a front elevational view of alternate apparatus for moving the electrode/dispensing tip.

(FIG. 7) capable of producing three-axis rectilinear movement of the dispenser.

Figure 8:
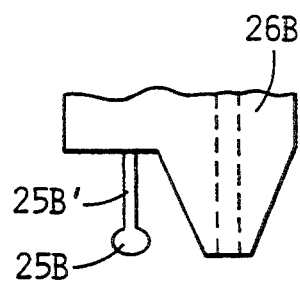
FIG. 8 is a fragmentary side elevation view of an alternative adhesive dispensing tip having a separate discharge electrode in close proximity thereto.

While in the foregoing embodiments the adhesive dispensing tip 26 defines and functions as an electrode, alternatively, a separate electrode 25B be located in close proximity to the adhesive dispensing tip 26B, such as illustrated in FIG. 8. While the discharge electrode 25B may take a variety of shapes, in this instance, it has a spherical end mounted on a thin metal stem 25B, the diameter of the sphere being between 1 and 10 mm. with a preferred size of 4–6 mm., and the stem having a diameter which is about one-third or less that of the sphere. The spherical electrode 25B is positioned in the front of the adhesive dispenser tip 26B in relation to its movement along the dispensing path, and in this instance, is disposed slightly closer to the surface than the dispensing tip 26B.

Figure 5:
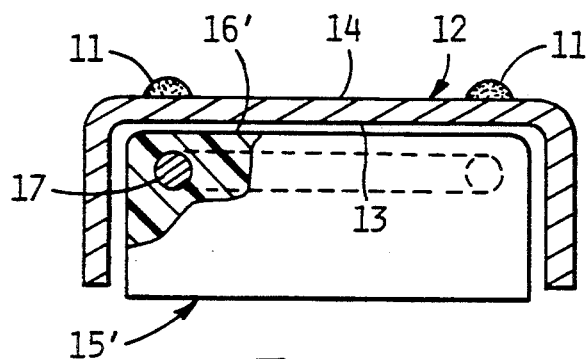
FIG. 5 is an enlarged view of a modified jig adapted to coact with the electrode to create the electrical discharge.
Figure 5A:
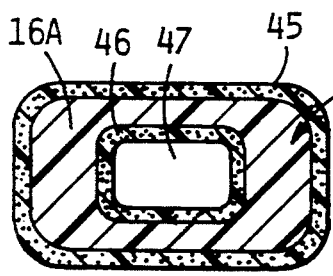
FIG. 5A is a top plan view schematically showing yet another jig.

In some cases, it is necessary to apply adhesive 11 around the extreme peripheral edge of a component 12 or closely adjacent openings in the component. In such case, it is desirable to insulate those areas of the metallized surface 16 at the peripheral edge and/or those areas immediately underlying the edge about openings in order to prevent the discharge arc from jumping directly to the metal. Such areas may be insulated with material of high dielectric strength and high thermal conductivity so that the material may dissipate large quantities of heat without breaking, burning or changing shape. An arc and ozone resistant insulation with a dielectric constant of between 2 and 6 is preferred. The insulation is placed on the surface 16 in such a location that there is no pronounced air gap between the outer surface of the insulation and the inner surface 13 of the component 12. FIG. 5A shows the upper surface 16A of a metallic jig 15A where areas at the peripheral edge of the component 12 to which adhesive is to be applied have been insulated at 45 and areas underlying an opening 47 in the component to which an adhesive is to be applied have been insulated as indicated at 46. Alternatively, in the case of a non-metallic jig, a metal wire or the like may be imbedded in the jig, such as illustrated in FIG. 5, about such peripheral edges of the jig and/or opening.

From the foregoing, it will be apparent that the present invention brings to the art a method and apparatus for simultaneous electrical discharge treatment of and adhesive application to a plastic surface. The invention eliminates the cost and complexity of handling the component in separate treatment and application stations and avoids the problems associated with the application of high voltage directly to a movable electrode.

I claim:

1. Apparatus for simultaneous electrical discharge treatment of and adhesive application to a first surface of a polymer component having an oppositely facing second surface, said apparatus comprising a jig having an electrically conductive region located adjacent and conforming at least in part to said second surface of said component, an adhesive dispenser having a dispensing tip means with an orifice located in close proximity to said first surface of said component, said dispensing tip means being electrically grounded so as to function as an electrode, means for applying voltage to said conductive region of said jig, means for moving said dispenser along a selected path relative to said component with said dispensing tip means in close proximity to the first surface of the component wherein said dispensing tip means coacts with said conductive region to cause an electrical discharge to be directed onto selected areas of said first surface, and means for causing adhesive to be dispensed from said orifice and onto said areas of said first surface at substantially the same time that said electrical discharge is directed onto said areas.

2. Apparatus as defined in claim 1 in which said tip means includes an outer periphery of circular cross section, a pocket formed in the end of said tip means defining a generally frustoconical wall, and said tip means having a relatively sharp annular edge formed at a junction of said wall with said outer periphery.

3. Apparatus as defined in claim 2 in which said tip means includes a nozzle centered within and extending axially from said pocket, said orifice being formed in said nozzle and being substantially coplanar with said edge.

4. Apparatus as defined in claim 3 in which said edge is spaced from said first surface of said component by a distance ranging between 1 mm and 15 mm.

5. Apparatus as defined in claim 1 in which said means for applying voltage to said conductive region of said jig comprise an ac. power generator, a high voltage transformer for amplifying an output signal of said generator, and means for connecting said conductive region of said jig electrically to an output of said transformer.

6. Apparatus as defined in claim 5 in which said power generator is capable of producing an ac. output signal at a frequency of between 50 Hz and 3 MHz, said transformer being capable of amplifying said signal to between 3 and 100 kilovolts RMS.

7. Apparatus as defined in claim 6 in which said ac. output signal is between 10 kHz and 40 kHz and in which said signal is amplified to between 10 and 60 kilovolts RMS.

8. Apparatus as defined in claim 1 in which said jig is made entirely from electrically conductive metal.

9. Apparatus as defined in claim 1 in which said jig is made from non-conductive material and has a metallized surface defining said conductive region.

10. Apparatus as defined in claim 9 in which said metallized surface is defined by strips of electrically conductive material bonded to said non-conductive material.

11. Apparatus as defined in claim 1 in which said jig is made from non-conductive material having an electrical conductor embedded therein, said conductor being located closely adjacent said second surface of said component and defining said conductive region.

12. Apparatus as defined in claim 1,wherein said polymer component further has having at outer periphery and at least one opening therein, said jig is made from a formable dielectric material, said electrically conductive region is and said dielectric material is disposed about and insulates said metallized surface along an area od said jig corresponding to an area of said periphery over which adhesive to be dispensed and along an area of said jig corresponding to a periphery of said opening over which adhesive is to be dispensed defined by a metallized surface of the jig.

13. Apparatus as defined in claim 1, wherein said polymer component further has having an outer periphery and at least one opening therein, said apparatus further comprising a dielectric insulating material disposed about and insulated said conductive material along an area of said jig corresponding to an area of said outer periphery over which adhesive to be dispensed and along an area of said jig corresponding to a periphery of said opening over which adhesive is to be dispensed.

14. Apparatus for simultaneous electrical discharge treatment of and adhesive application to a first surface of a polymer component having an oppositely facing second surface, said apparatus comprising a jig having an electrically conductive region located adjacent and conforming at least in part to said second surface of said component, an adhesive dispenser having a dispensing tip with a dispensing orifice located in close proximity to said first surface of said component, said dispenser having an electrically grounded electrode, means for applying voltage to said conductive region of said jig, means for moving said dispenser along a selected path relative to said component with said orifice and said electrode disposed in close proximity to the first surface of the component wherein said electrode has a means to coact with said conductive region to cause an electrical discharge to be directed onto selected areas of said first surface, and means for causing adhesive to be dispensed from said orifice and onto said areas of said first surface at substantially the same time that said electrical discharge is directed onto said areas.

15. Apparatus as defined in claim 14 in which said electrode and said dispensing orifice are relatively positioned such that at least a portion of said electrode precedes said orifice as said dispenser and said electrode are moved along said path.

16. The apparatus as defined in claim 14 in which said electrode is mounted immediately adjacent said discharge orifice on a front side thereof in relation to its movement along a dispensing path.

17. The apparatus as defined in claim 16 in which said electrode has a spherical end mounted on a relatively narrow stem.

18. The apparatus of claim 17 in which said spherical end is disposed in closer relation to said first surface of the polymer component to be treated than said dispensing orifice.

19. Apparatus as defined in claim 14 in which said means for applying voltage to said conductive region of said jig comprise an ac. power generator, a high voltage transformer for amplifying an output signal of said generator, and means for connecting said conductive region of said jig electrically to an output of said transformer.

20. Apparatus as defined in claim 14 in which said jig is made entirely from electrically conductive metal.

21. Apparatus as defined in claim 14 in which said jig is made from non-conductive material and has a metallized surface defining said conductive region.

22. Apparatus as defined in claim 14 in which said jig is made from non-conductive material having an electrical conductor embedded therein, said conductor being located closely adjacent said second surface of said component and defining said conductive region.

23. Apparatus as defined in claim 14 wherein said polymer component further has having an outer periphery and at least one opening therein, said jig is made from a formable dielectric material, said electrically conductive region is defined by a metallized surface of the jig, and said dielectric material is disposed about and insulates said metallized surface along an area od said jig corresponding to an area of said periphery over which adhesive to be dispensed and along an area of said jig corresponding to a periphery of said opening over which adhesive is to be dispensed.

24. Apparatus as defined in claim 14 wherein said polymer component further has having an outer periphery and at least one opening therein, said apparatus further comprising a dielectric insulating material disposed about and insulated said conductive material along an area of said jig corresponding to an area of said outer periphery over which adhesive to be dispensed and along an area of said jig corresponding to a periphery of said opening over which adhesive is to be dispensed.

25. A method of simultaneous electrical discharge treatment of and adhesive application to a first surface of a polymer component having an oppositely facing second surface, said method comprising the steps of:

(A) providing (i) a jig having an electrically conductive region conforming at least in part to said second surface of said component, and (ii) an adhesive dispenser having an electrically grounded dispensing tip with a dispensing orifice which functions as an electrode, (B) placing the second surface of said component immediately adjacent said electrically conductive region of said jig, (C) applying voltage to the electrically conductive region of said jig, (D) locating said dispensing tip in close proximity to said first surface of said component to cause said tip to coact with said electrically conductive region and direct an electrical discharge onto said first surface of said component, (E) moving said along a selected path across said first surface of said component and, during such movement, (F) dispensing adhesive from said orifice and onto areas of said first surface at substantially the same time that said electrical discharge is directed onto said areas.

26. A method as defined in claim 25 in which at least a portion of said electrical discharge precedes the dispensed adhesive from said orifice as said tip is moved along said path.

* * * * *